United States Patent
Pinheiro et al.

(10) Patent No.: US 10,496,896 B2
(45) Date of Patent: Dec. 3, 2019

(54) GENERATING OBJECT PROPOSALS USING DEEP-LEARNING MODELS

(71) Applicant: Facebook, Inc., Menlo Park, CA (US)

(72) Inventors: Pedro Henrique Oliveira Pinheiro, Saint Sulpice (CH); Ronan Stéfan Collobert, Mountain View, CA (US); Piotr Dollar, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/370,491

(22) Filed: Mar. 29, 2019

(65) Prior Publication Data

US 2019/0228259 A1  Jul. 25, 2019

Related U.S. Application Data

(63) Continuation of application No. 15/624,643, filed on Jun. 15, 2017, now Pat. No. 10,255,522.

(60) Provisional application No. 62/351,851, filed on Jun. 17, 2016.

(51) Int. Cl.
| | |
|---|---|
| *G06K 9/00* | (2006.01) |
| *G06K 9/62* | (2006.01) |
| *G06N 5/04* | (2006.01) |
| *G06N 3/04* | (2006.01) |
| *G06N 20/00* | (2019.01) |
| *G06K 9/46* | (2006.01) |
| *G06N 3/08* | (2006.01) |

(52) U.S. Cl.
CPC ....... *G06K 9/6212* (2013.01); *G06K 9/00201* (2013.01); *G06K 9/4628* (2013.01); *G06K 9/6271* (2013.01); *G06N 3/04* (2013.01); *G06N 3/0454* (2013.01); *G06N 3/084* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,405,960 B2 * | 8/2016 | Yin | G06K 9/00221 |
| 9,418,319 B2 * | 8/2016 | Shen | G06K 9/4628 |
| 9,697,416 B2 * | 7/2017 | Shen | G06K 9/4628 |
| 2017/0046613 A1 * | 2/2017 | Paluri | G06N 3/0454 |
| 2017/0345181 A1 * | 11/2017 | Yu | G06T 7/194 |
| 2018/0165548 A1 * | 6/2018 | Wang | G06N 3/084 |
| 2018/0285686 A1 * | 10/2018 | Pinheiro | G06F 15/76 |

* cited by examiner

*Primary Examiner* — Soo Jin Park
(74) *Attorney, Agent, or Firm* — Baker Botts L.L.P.

(57) ABSTRACT

In one embodiment, a plurality of patches of an image are processed using a first-pass of a first deep-learning model to generate object-level information for each of the patches. Each patch includes one or more pixels of the image. Using a second-pass of the first deep-learning model, a respective object proposal is generated for each of the plurality of patches of the image. The second-pass takes as input the first-pass output, and the generated respective object proposals comprise pixel-level information for each of the patches. Using a second deep-learning model, a respective score is computed for each object proposal. The second deep-learning model takes as input the first-pass output, and the object score includes a likelihood that the respective patch of the object proposal contains an entire object.

19 Claims, 11 Drawing Sheets

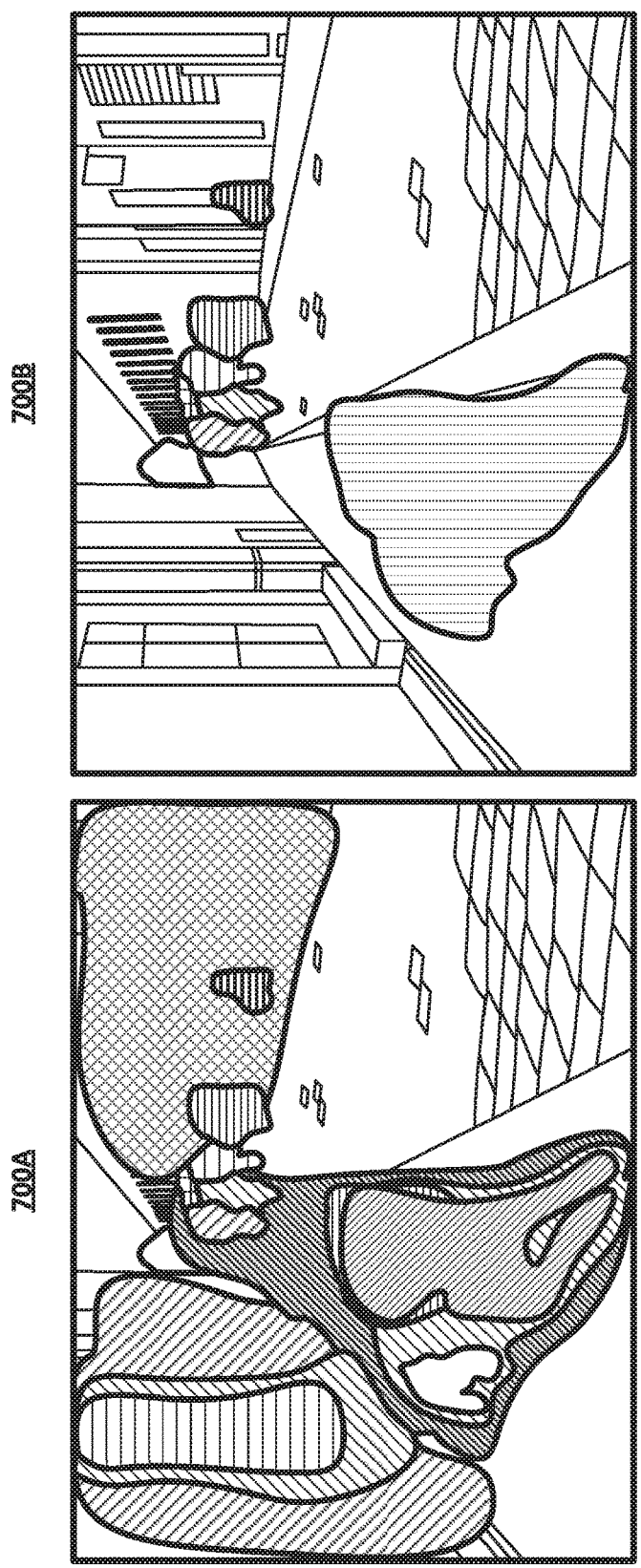

1000 processing a plurality of patches of an image, using a first set of layers of a convolutional neural network, to output a plurality of object proposals associated with the plurality of patches of the image, wherein each patch comprises one or more pixels of the image, and wherein each object proposal comprises a prediction as to a location of an object in the respective patch ~1010 processing, by one or more computing devices, using a second set of layers of the convolutional neural network, the plurality of object proposals outputted by the first set of layers of the convolutional neural network, to generate a plurality of refined object proposals, each refined object proposal comprising pixel-level information for the respective patch of the image, where the first layer in the second set of layers of the convolutional neural network takes as input the plurality of object proposals outputted by the first set of layers, and each layer after the first layer in the second set of layers takes as input the output of a preceding layer in the second set of layers combined with the output of a respective layer of the first set of layers. ~1020

*FIG. 10*

GENERATING OBJECT PROPOSALS USING DEEP-LEARNING MODELS

PRIORITY

This application is a continuation under 35 U.S.C. § 120 of U.S. patent application Ser. No. 15/624,643, filed 15 Jun. 2017, which claims the benefit, under 35 U.S.C. § 119(e), of U.S. Provisional Patent Application No. 62/351,851, filed 17 Jun. 2016, each of which is incorporated herein by reference.

TECHNICAL FIELD

This disclosure generally relates to identification of objects in images.

BACKGROUND

Deep-learning is a type of machine learning that may involve training a model in a supervised or unsupervised setting. Deep-learning models may be trained to learn representations of data. Deep-learning models may be based on a set of algorithms that are designed to model abstractions in data by using a number of processing layers. The processing layers may be made up of non-linear transformations. Deep-learning models may include, as an example and not by way of limitation, neural networks and convolutional neural networks. Convolutional neural networks may be made of up a hierarchy of trainable filters, interleaved with non-linearities and pooling. Convolutional neural networks may be used in large-scale object recognition tasks.

SUMMARY OF PARTICULAR EMBODIMENTS

In particular embodiments, a system may use one or more deep-learning models to generate a number of object proposals (i.e., masks) for an image. Deep-learning models (e.g., convolutional neural networks) may be trained to generate object proposal for patches of an image and to generate object scores representing likelihoods that respective patches fully contain objects. The object score for each object proposal may be a scalar number. As used herein, a patch of an image may refer to a section or crop of an image (e.g., a collection of pixels). As used herein, an object proposal may refer to a binary image of numbers that are 0, 1, or unknown (i.e., a number between 0 and 1), and a 0 may indicate a pixel that is not on an object while a 1 may indicate a pixel that is on an object of the image. Objects, as used herein, may refer to any identifiable item in an image. As an example and not by way of limitation, objects may include, a person, a chair, a head, a tree, a dog, a dog's collar, a house, a car, a road, or any other suitable item that can be identified in an image. The deep-learning model may be trained using images that have objects of differing sizes and objects located at differing positions in the image. The deep-learning models may then automatically learn patterns from the training data in order to identify objects in new images.

In particular embodiments, the deep-learning model may be a convolutional neural network (i.e., deep convolutional neural network). The convolutional neural network may be a feed-forward network. A feed-forward network (i.e., information flows in one direction through the layers of the network) may provide high-level information regarding positions of objects in an image (i.e., coarse masks/object proposals). In particular embodiments, the deep-learning model may include forward-pass layers (i.e., bottom-up architecture) and backward-pass layers (i.e., top-down architecture). This two-pass convolutional neural network architecture may be used to obtain high-level information and low-level information (i.e., high-resolution masks/object proposals). The two-pass convolutional neural network may be used to obtain high-resolution object proposals. The two-pass convolutional neural network may also be used in pixel labelling tasks.

Object proposals may be used to accomplish any number of suitable tasks. A system may use object-identification algorithms to identify, for an object proposal, what the corresponding object is. As an example and not by way of limitation, an object proposal may provide information regarding the location of an object and may identify the object as being different from proximate objects, and the system may determine based on the object proposal and using object-identification techniques, that the identified object is an American Pit Bull Terrier.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7A AND 7B illustrate example object proposals overlaying images.

FIG. 10 illustrates an example system for determining refined object proposals.

DESCRIPTION OF EXAMPLE EMBODIMENTS

System Overview

Figure 1:
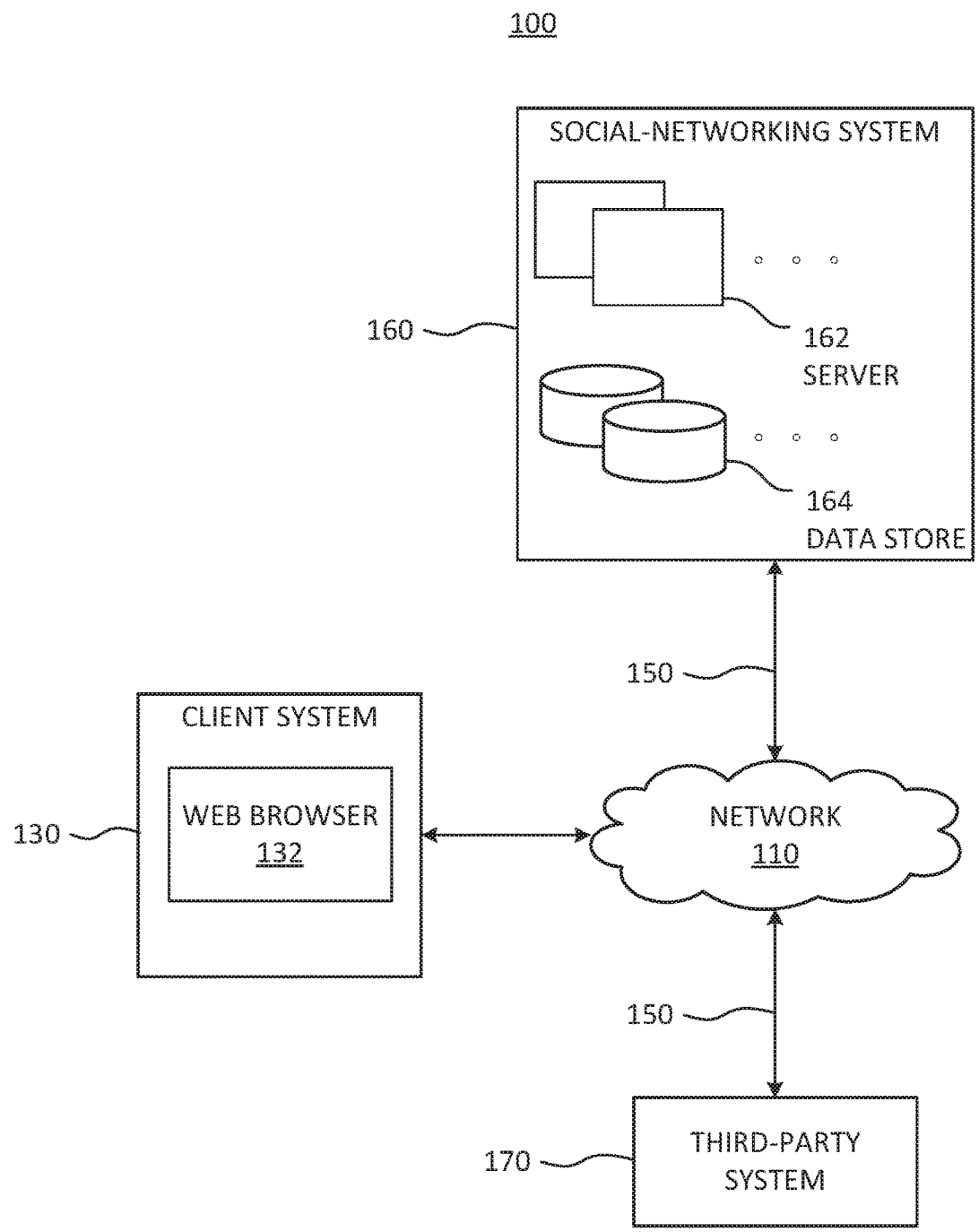
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
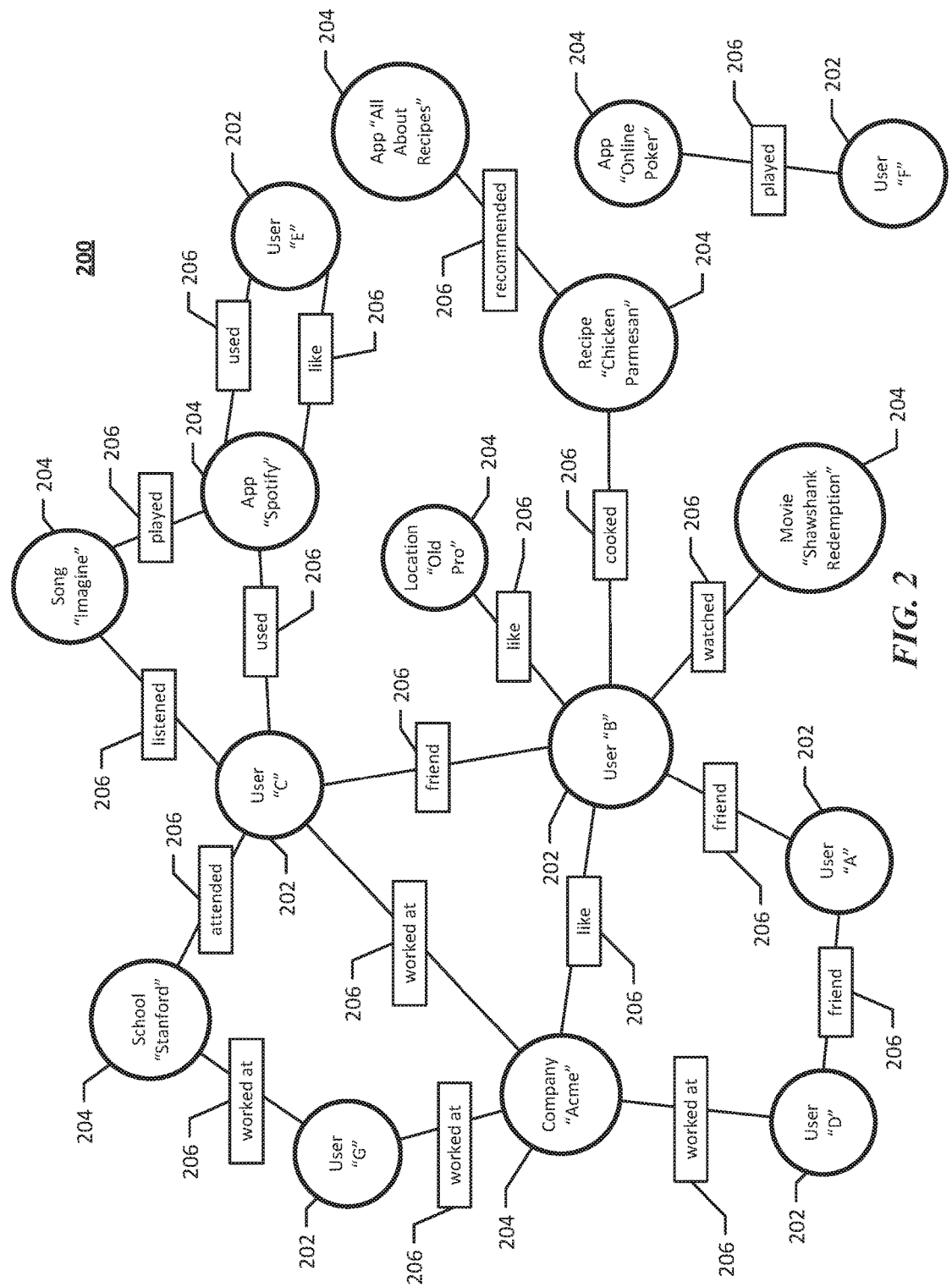
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Generating Object Proposals and Object Scores for Images

Figure 3B:
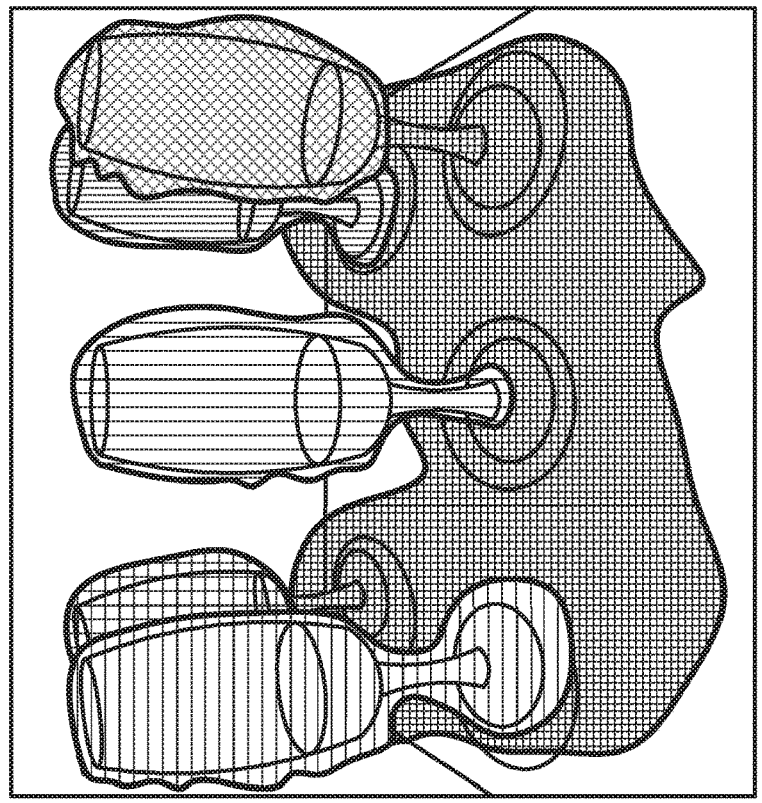
FIG. 3B illustrates an example object proposal overlaying an image.
Figure 3A:
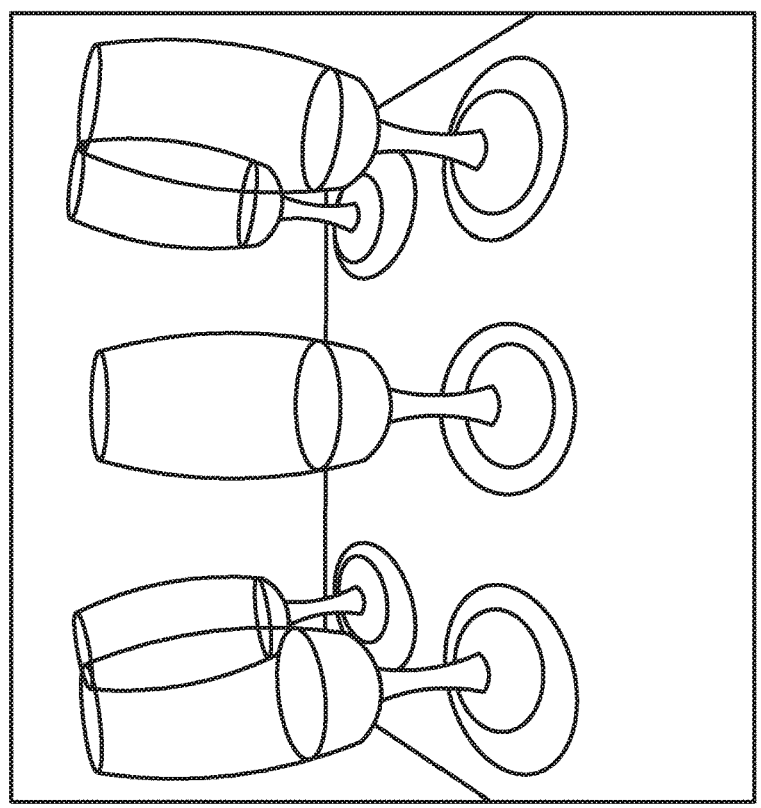
FIG. 3A illustrates an example input image.

FIG. 3A illustrates an example image 300A. Image 300A may be of any suitable size or resolution. The system may process patches of image 300A in order to generate object proposals (i.e., identifications of objects in image 300A). FIG. 3B illustrates example object proposals overlaying an image. Image 300B in FIG. 3B shows a plurality of object proposals overlaying image 300A from FIG. 3A. In particular embodiments, a system may determine a plurality of object proposals for an image in order to, for example, identify objects in the image. An object may be any suitable identifiable item in an image (e.g., a person, an animal, an arm, a leg, a cup, etc.). In the example embodiment of FIG. 3B, object proposals are represented as shapes overlaying objects in images. As an example and not by way of limitation, in FIG. 3A, the champagne flutes (i.e., objects) are shown as having a corresponding overlaying object proposals. In particular embodiments, the system may determine object proposals using a deep-learning model (e.g., a convolutional neural network). The deep-learning model may employ an algorithm that provides an output of object proposals with recall higher than a predetermined threshold (e.g., the system identifies objects in the forefront, which are differentiated from less important objects in the background), recall higher than a predetermined threshold within a minimum number of regions, and high-quality localization (e.g., accurate identification of locations of objects).

Although this disclosure describes and illustrates particular embodiments of FIGS. 3A and 3B being implemented by a system, this disclosure contemplates any suitable embodiments of FIGS. 3A and 3B as being implemented by any suitable platform or system. As an example, and not by way of limitation, particular embodiments of FIGS. 3A and 3B may be implemented by social-networking system 160, third-party system 170, or any other suitable system. Furthermore, although this disclosure describes and illustrates particular components, devices, or systems carrying out particular steps of the method of FIGS. 3A and 3B, this disclosure contemplates any suitable combination of any suitable components, devices, or systems carrying out any suitable steps of the method of FIGS. 3A and 3B.

Figure 4:
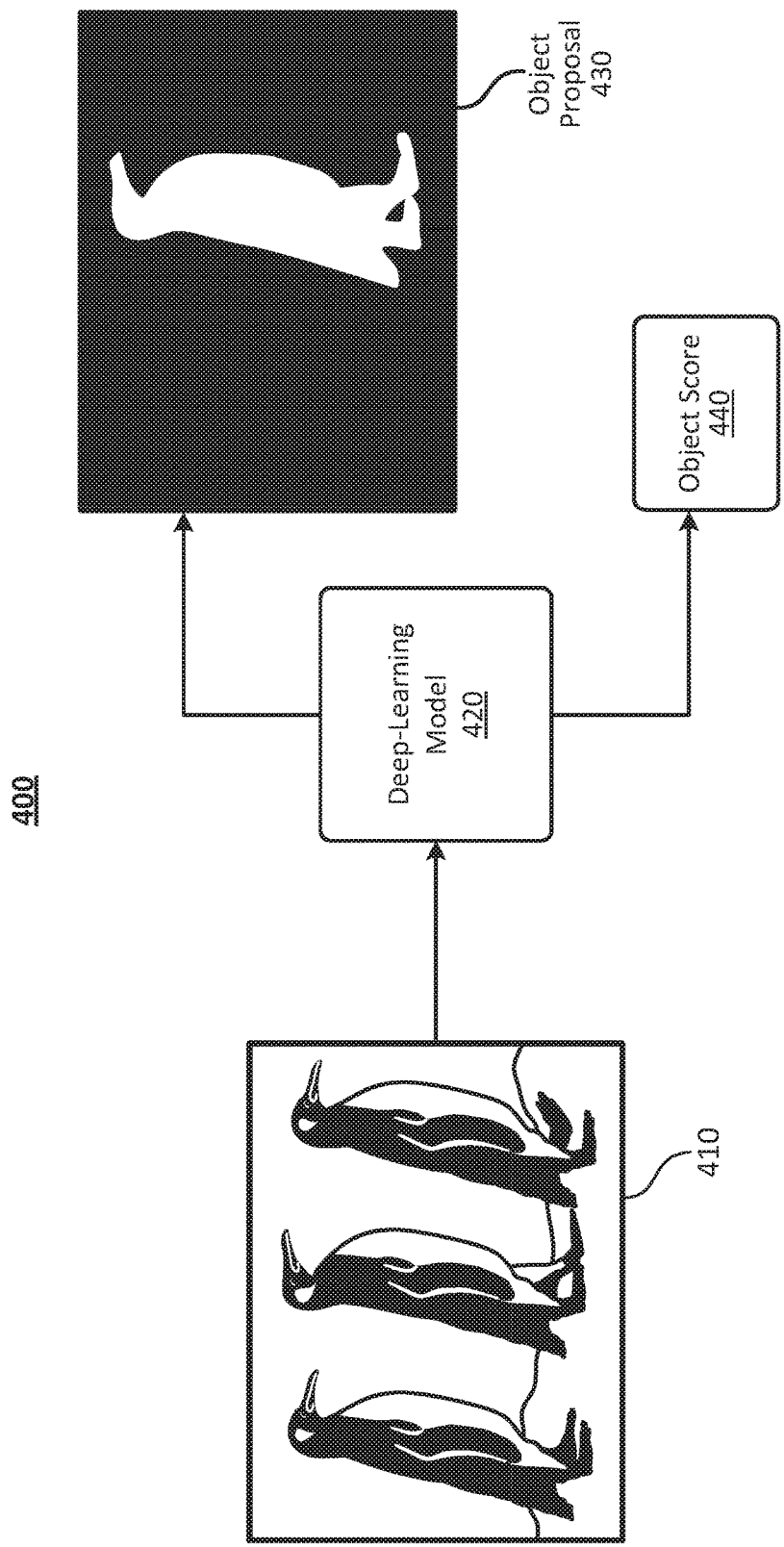
FIG. 4 illustrates an example system for predicting object proposals and object scores.

FIG. 4 illustrates an example system 400 for predicting object proposals 430 and object scores 440. In FIG. 4, the system 400 is depicted as including a deep-learning model 420. As an example and not by way of limitation, deep-learning model 420 may be any suitable number of convolutional neural networks. In particular embodiments, the system may take in a plurality of patches of images 410 as inputs and output, for each patch input 410, an object proposal 430 (i.e., a binary identification of the location of the object) and a score 440 (i.e., a scalar quantity predicting whether there is an object in the patch or not). As an example and not by way of limitation, if the patch shows a background section of an image (i.e., no discernible object), the object score predicted may be zero. It will be understood that the system is generally described as having one object proposal and one score output for each patch for ease of description, not by way of limitation. In particular embodiments, the system may, for each input patch, output one or more one or more object proposals 430 and one or more corresponding scores 440.

The system may use a fixed size window to analyze a plurality of overlapping, densely-packed patches of an image. In particular embodiments, the single window may be run over a whole image so that for every overlapping window (i.e., patch) in an image, the deep-learning models may output an object proposal and a score. The system may shift and resize the image to obtain different patches for analysis in the window. As an example and not by way of limitation, the window may be a fixed 200×200 pixels, and the patch will always also be of that fixed size for the particular image being analyzed. The image may be any suitable size. The system may shift by a fixed amount of pixels every time so that the patches are densely packed and overlapping (e.g., 16-pixel shift). The system may also scale (i.e., zoom in or out) by a fixed scale each time (e.g., shrink by 2½ times the size of the image). As an example and not by way of limitation, an image may be 200 pixels, the system may run a plurality of 16-pixel shifted windows of the 200-pixel image through the deep-learning model to obtain object proposals. The system may then shrink the image by a factor of 2½, run the 16-pixel shifted windows of the down-sized image through the image through the deep-learning model to obtain additional object proposals for the image. The system may then shrink the object by another factor of 2½, to get an image that is half the size of the original image (i.e., 100 pixels) and may run the 16-pixel shifted windows of the 100-pixel image through the deep-learning model to obtain additional object proposals for the image. This sliding and scaling window approach ensures that the system is able to generate object proposals for objects at different positions in the image and for objects of different sizes. In particular embodiments, the system may use enough differently-located and sized patches of an image so that for each object in the image, at least one patch is run through the system that fully contains the object (i.e., roughly centered and at the appropriate scale).

Although this disclosure describes and illustrates particular embodiments of FIG. 4 being implemented by a system, this disclosure contemplates any suitable embodiments of FIG. 4 as being implemented by any suitable platform or system. As an example, and not by way of limitation, particular embodiments of FIG. 4 may be implemented by social-networking system 160, third-party system 170, or any other suitable system. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
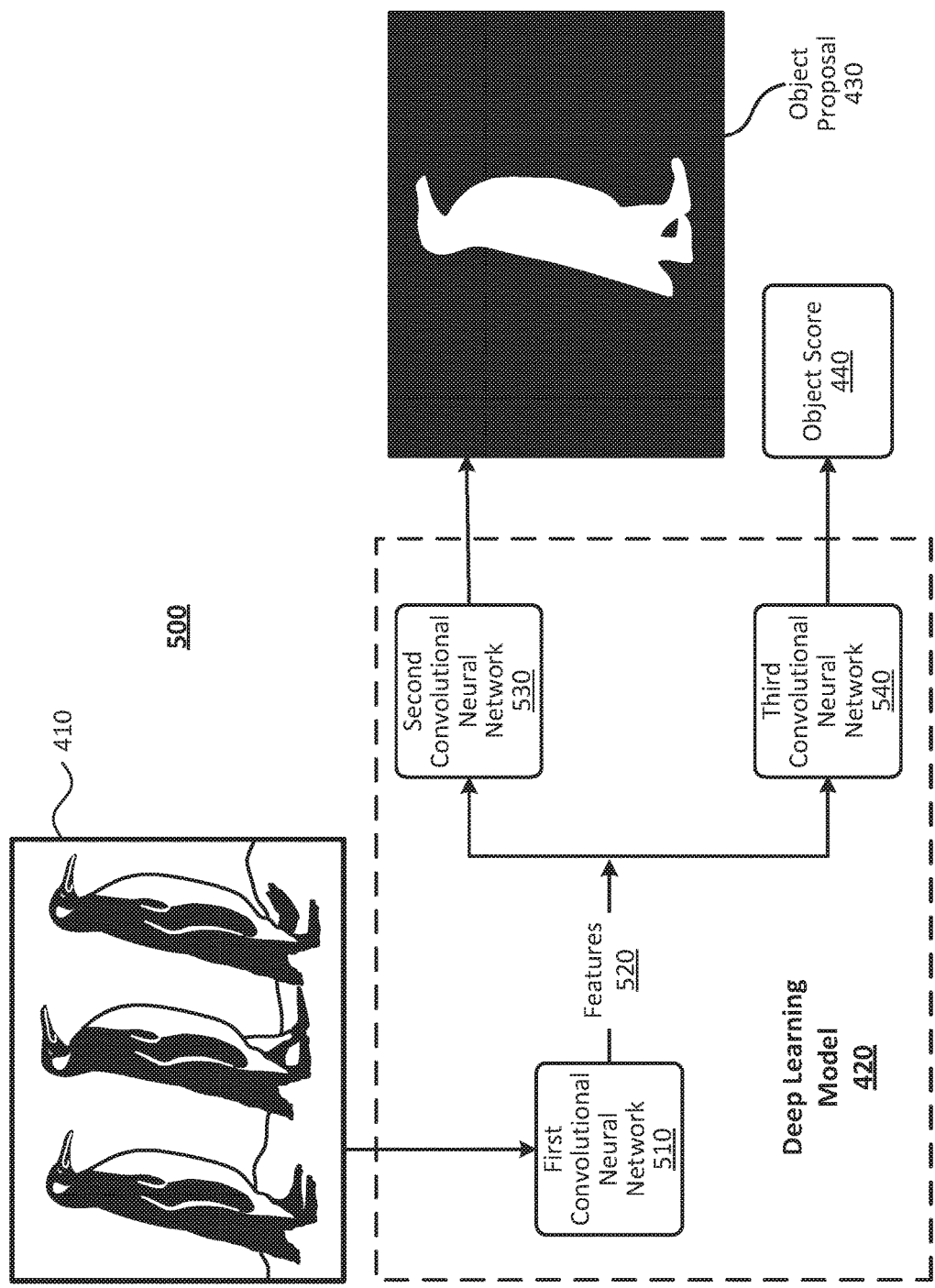
FIG. 5 illustrates an example system for predicting object proposals and object scores.

FIG. 5 illustrates example system 500 for predicting object proposals 430 and object scores 440. System 500 may include one or more deep-learning models 420 (i.e., first, second, and third convolutional neural networks 510, 530, and 540). In particular embodiments, one or more of the deep-learning models may be discriminative convolutional networks or convolutional neural networks. In the illustrated example of FIG. 5, system 500 includes a first convolutional neural network 510, a second convolutional neural network 530, and a third convolutional neural network 540.

In particular embodiments, the system may include three convolutional neural networks—first convolutional neural network 510, first convolutional neural network 530, and third convolutional neural network 540. As shown in the illustrated embodiment of FIG. 5, the system may have a first, feature-extraction convolutional neural network (i.e., first convolutional neural network 510) that may take as inputs patches of images 410 and output features 520 of the patch/image (i.e., any number of features detected in the image). The feature-extraction layers may be pre-trained to perform classification on the image. The feature-extraction model may be fine-tuned for object proposals during training of the system. As an example and not by way of limitation, the feature-extraction layers may consist of eight 3×3 convolutional layers and five 2×2 max-pooling layers. As an example and not by way of limitation, the feature-extraction layers may take an input image of dimension 3×h×w, and the output (i.e., features 520) may be a feature map of dimensions $$512 \times \frac{h}{16} \times \frac{w}{16}.$$

In particular embodiments, the system may split into two branches after the shared feature-extraction module (i.e., first convolutional neural network 510). The output of the feature-extraction convolutional neural network (i.e., features 520) may be inputted into the top-branch convolutional neural network and the bottom-branch convolutional neural network. Thus, a large part of the system 500 is shared at the feature-extraction convolutional neural network stage. The layers of the upper branch and lower branch convolutional neural networks may be specialized for separately outputting an object proposal 430 and an object-score prediction 440, respectively. The system (i.e., the three convolutional neural network models 510, 530, and 540) may be trained by optimizing a cost function that targets both tasks (i.e., generating an object proposal and predicting an object score) simultaneously. In particular embodiments, the system may be trained using a first training dataset and may be evaluated on two object-detection datasets, the first training dataset and a second dataset. As described in further detail below, the upper branch convolutional neural network may be trained to generate an object proposal 430 for patches of an image, and the bottom branch convolutional neural network may be trained to generate a scalar object score 440 (i.e., a likelihood that the patch contains a full object. For each patch inputted into the system, an object proposal and a corresponding object score are determined.

In particular embodiments, system 500 may have two branches—an object-proposal branch and an object-score branch. In the illustrated embodiment of FIG. 5, the top branch of system 500 is the object-proposal branch and includes first convolutional neural network 510, which may output features 520, and second convolutional neural network 530, which may output object proposals 430. In the illustrated embodiment of FIG. 5, the bottom branch of system 500 is the object-score branch and includes first convolutional neural network 510, which may output features 520, and third convolutional neural network 540, which may output object scores 430. First convolutional network 510 may be shared by the top and bottom branches of the system in order to save processing power. In particular embodiments, the two branches of deep-learning models may be trained jointly, each branch having a separate objective. The top branch (i.e., first convolutional neural network 510 and second convolutional neural network 530) may have the following training objection: given an image patch, the upper branch of the system outputs a class-agnostic segmentation object proposal. The bottom branch (i.e., first convolutional neural network 510 and third convolutional neural network 540) may have the following training objective: given an image patch, the bottom branch of the system outputs an object score that is the likelihood of the patch being centered on a full object.

In particular embodiments, the top branch of the system 500 (i.e., object-proposal branch) may be dedicated to segmentation (i.e., object-proposal identification) and may be composed of second convolutional neural network 530 that takes as input the features 520 outputted by first convolutional neural network 510. In particular embodiments, the object-proposal branch may include a single 1×1 convolution layer followed by a classification layer (i.e., after the feature extraction layers of first convolutional neural network 510). The classification layer may consist of h×w pixel classifiers (h×w denoting the height and width dimensions), each responsible for indicating whether a given pixel belongs to the object in the center of the patch. Each pixel classifier in the output plane may be able to utilize information contained in the entire feature map, and thus have a complete view of the object. This may allow the system to output an object proposal for a single object even when multiple objects are present (e.g., the multiple champagne flutes shown in FIG. 3B). As an example and not by way of limitation, the system may summarize all of the information for the entire feature map in a single vector that has no spatial dimensions. Every pixel in the object proposal gets a view of the entire image by utilizing the summarized feature vector. In particular embodiments, for the classification layer the system may use locally-connected pixel classifiers. In particular embodiments, for the classification layer the system may use fully-connected pixel classifiers. In particular embodiments, the system decomposes the classification layer into two linear layers with no non-linearity in between (i.e., a low-rank variant of using fully connected linear classifiers). In this embodiment, the number of network parameters may be reduced while allowing each pixel classifier to leverage information from the entire feature map. In particular embodiments, to further reduce model capacity, the output of the classification layer may be set to be $h_o \times w_o$ with $h_o < h$ and $w_o < w$ and the output may be up-sampled to h×w to match the input dimensions. where h×w denotes the height and width of the input, and $h_o \times w_o$ denotes the height and width of the output.

The bottom branch of the system 500 (i.e., object-score branch) may be dedicated to predicting if an image patch satisfies constraints (i) and (ii): that is if an object is centered in the patch and at the appropriate scale. The bottom branch may be a convolutional neural network (i.e., third convolutional neural network 540) that takes as input features 520 outputted by first convolutional neural network 510. The bottom branch may be composed of a 2×2 max-pooling layer, followed by two fully-connected layers. The final output of the bottom branch convolutional neural network may be an object score 440 indicating the presence of an object in the center of the input patch (and at the appropriate scale).

It will be understood that the system is described as having multiple component convolutional neural networks for ease of description, not by way of limitation. As an example and not by way of limitation, the entire system illustrated in FIG. 5 may also be termed a single convolutional neural network composed of layers arranged in the described two-branch architecture. In this manner, both object-proposal and object-score predictions may be made with a single convolutional neural network.

Although this disclosure describes and illustrates particular embodiments of FIG. 5 being implemented by a system, this disclosure contemplates any suitable embodiments of FIG. 5 as being implemented by any suitable platform or system. As an example, and not by way of limitation, particular embodiments of FIG. 5 may be implemented by social-networking system 160, third-party system 170, or any other suitable system. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6A:
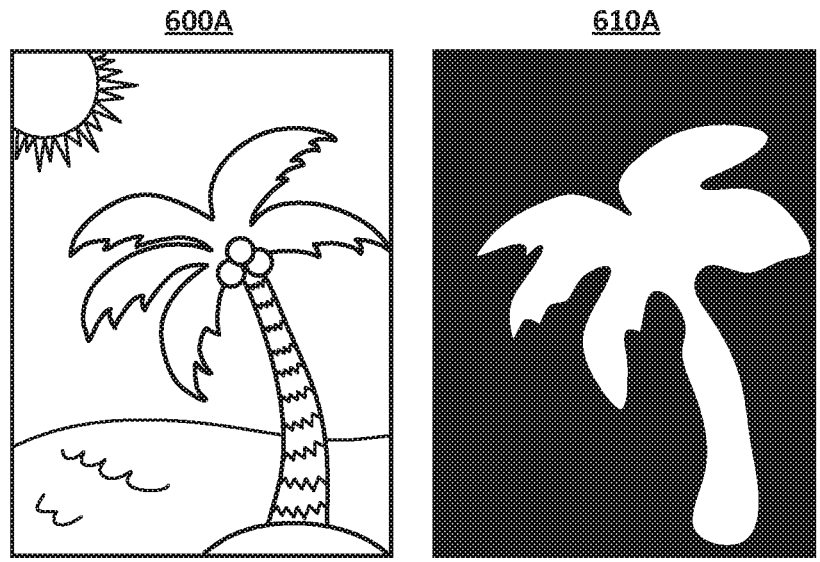
FIGS. 6A AND 6B illustrate example training data for training a system for predicting object proposals and object scores.
Figure 6B:
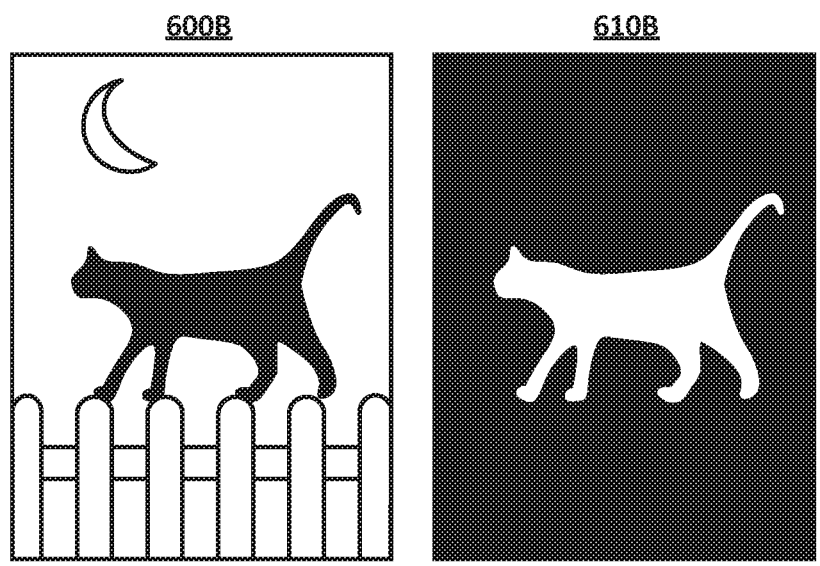

FIGS. 6A AND 6B illustrate example training data for training a system for predicting object proposals and scores. As described above, the system may be a convolutional neural network that generates object proposals and a score for each object proposal. As an example and not by way of limitation, the two tasks may share a plurality of layers of the network (e.g., feature-extraction layers), and the remaining layers may be task-specific layers. In particular embodiments, the convolutional neural network may be jointly trained, which may result in reduced model capacity and increased speed in determining the object proposals and scores.

The training set may include a number of samples k, and each sample k may be a triplet containing (1) an RGB input patch $x_k$, (2) the binary object proposal corresponding to the input patch $m_k$ (with $m_k^{ij} \in \{\pm 1\}$, where (i,j) corresponds to a pixel location on the input patch), and (3) a label $y_k \in \{\pm 1\}$, which specifies whether the patch contains an object. Specifically, a patch $x_k$ may be given label $y_k=1$ if it satisfies the following constraints: (i) the patch contains an object roughly centered in the input patch, and (ii) the object is fully contained in the patch and in a given scale range. A patch $x_k$ may be given label $y_k=-1$ even if an object is partially present. Assuming $y_k=1$, the object proposal $m_k$ may have positive values only for the pixels that are part of the single object located in the center of the patch. If $y_k=-1$ the object proposal may not be used. FIGS. 6A and 6B show examples of triplets that may be in the training set for training the convolutional neural network. In FIGS. 6BA and 6B, patches 600A and 600B are training input patches, and object proposals 610A and 610B are binary object proposals corresponding respectively to patches 600A and 600B. The labels are not shown in FIGS. 6A and 6B but would be provided. In both FIGS. 6A and 6B, patches 600A and 600B contain an object roughly centered in the input path, and the object is fully contained in the patch and in a given scale range, so the labels may be $y_k=1$ for both.

In particular embodiments, the convolutional neural network may be jointly trained using the following method: Given an input patch $x_k \in \mathbb{I}$, $\mathbb{I}$ denoting the set of image patches, the convolutional neural network may be trained to jointly infer a pixel-wise object proposal (e.g., segmentation mask) and an object score. In particular embodiments, the loss function for training the convolutional neural network may be sum of binary logistic regression losses, one for each location of the convolutional neural network and one for the object score, over all training triplets $(x_k, m_k, y_k)$, given by eq. (1):

$$\mathcal{L}(\theta) = \sum_k \left( \frac{1+y_k}{2w^o h^o} \sum_{ij} \log\left(1 + e^{-m_k^{ij} f_{segm}^{ij}(x_k)}\right) + \lambda \log(1 + e^{-y_k f_{score}(x_k)}) \right) \quad (1)$$

As used herein, θ denotes the set of parameters, $f_{segm}^{ij}(x_k)$ denotes the prediction of the convolutional neural network at location (i,j), and $f_{score}(x_k)$ denotes the predicted object score. The system may be trained by alternating between the object-proposal branch (e.g., the top-branch convolutional neural network in FIG. 5) and the object-score branch (e.g., the bottom-branch convolutional neural network in FIG. 5). As an example and not by way of limitation, the training may be accomplished by back-propagating and setting $$\lambda = \frac{1}{32}.$$

In particular embodiments, for the object-score branch, training data may be sampled so that the object-score branch (e.g., the top-branch convolutional neural network in FIG. 5) is trained with an equal number of positive samples (e.g., patches of images with fully-contained objects) and negative samples (i.e., patches of images with partial or no objects). In particular embodiments, for the object-proposal branch, training data may be sampled so that the object-proposal branch (e.g., the top-branch convolutional neural network in FIG. 5) is trained with only positive samples (e.g., patches of images with full-contained objects).

Although this disclosure describes and illustrates particular embodiments of FIGS. 6A and 6B being implemented by a system, this disclosure contemplates any suitable embodiments of FIGS. 6A and 6B as being implemented by any suitable platform or system. As an example, and not by way of limitation, particular embodiments of FIGS. 6A and 6B may be implemented by social-networking system 160, third-party system 170, or any other suitable system. Furthermore, although this disclosure describes and illustrates particular components, devices, or systems carrying out particular steps of the method of FIGS. 6A and 6B, this disclosure contemplates any suitable combination of any suitable components, devices, or systems carrying out any suitable steps of the method of FIGS. 6A and 6B.

FIGS. 7A AND 7B illustrate example object proposals overlaying images 700A and 700B. FIG. 7A depicts an image with a plurality of overlapping object proposals. In particular embodiments, the object proposals may be ranked using the respective object scores determined for each. In other words, the system may determine ranks for the object proposals based on which object proposals have the highest scores and thus the highest likelihoods of fully containing objects. In particular embodiments, the system may keep a predetermined number or percentage of high-ranked object proposals, the top-ranked object proposal, or any other suitable number of object proposals based on the rankings. The system may throw away the rest of the lower-ranked object proposals. FIG. 7B depicts the same image as that in FIG. 7A, but FIG. 7A depicts only the top-ranked object proposals. In particular objects, the number and quality of object proposals that are kept may be determined based on a particular application or algorithm into which the object proposals may be fed as input. As an example and not by way of limitation, the system may use object-identification techniques to determine what the objects in the object proposals are (i.e., that the shapes in FIG. 7A are an American Pit Bull Terrier and people walking in the background), and the object-identification techniques may have particular benchmarks for quality and quantity of object-proposals 430 to be used. As another example and not by way of limitation, one or more of the object proposals (e.g., object proposals 430 having object scores 440 higher than a predetermined threshold) may be used to accomplish various tasks including depth estimation (e.g., for every pixel, assign a depth value), optical-flow motion estimation (e.g., for every pixel, predict where that pixel is moving), pose estimation (e.g., of a human-body pose), object movement and tracking, or any other suitable task that may determine information based on object proposals.

Although this disclosure describes and illustrates particular embodiments of FIGS. 7A and 7B being implemented by a system, this disclosure contemplates any suitable embodiments of FIGS. 7A and 7B as being implemented by any suitable platform or system. As an example, and not by way of limitation, particular embodiments of FIGS. 7A and 7B may be implemented by social-networking system 160, third-party system 170, or any other suitable system. Furthermore, although this disclosure describes and illustrates particular components, devices, or systems carrying out particular steps of the method of FIGS. 7A and 7B, this disclosure contemplates any suitable combination of any suitable components, devices, or systems carrying out any suitable steps of the method of FIGS. 7A and 7B.

Refining Object Proposals

Figure 8:
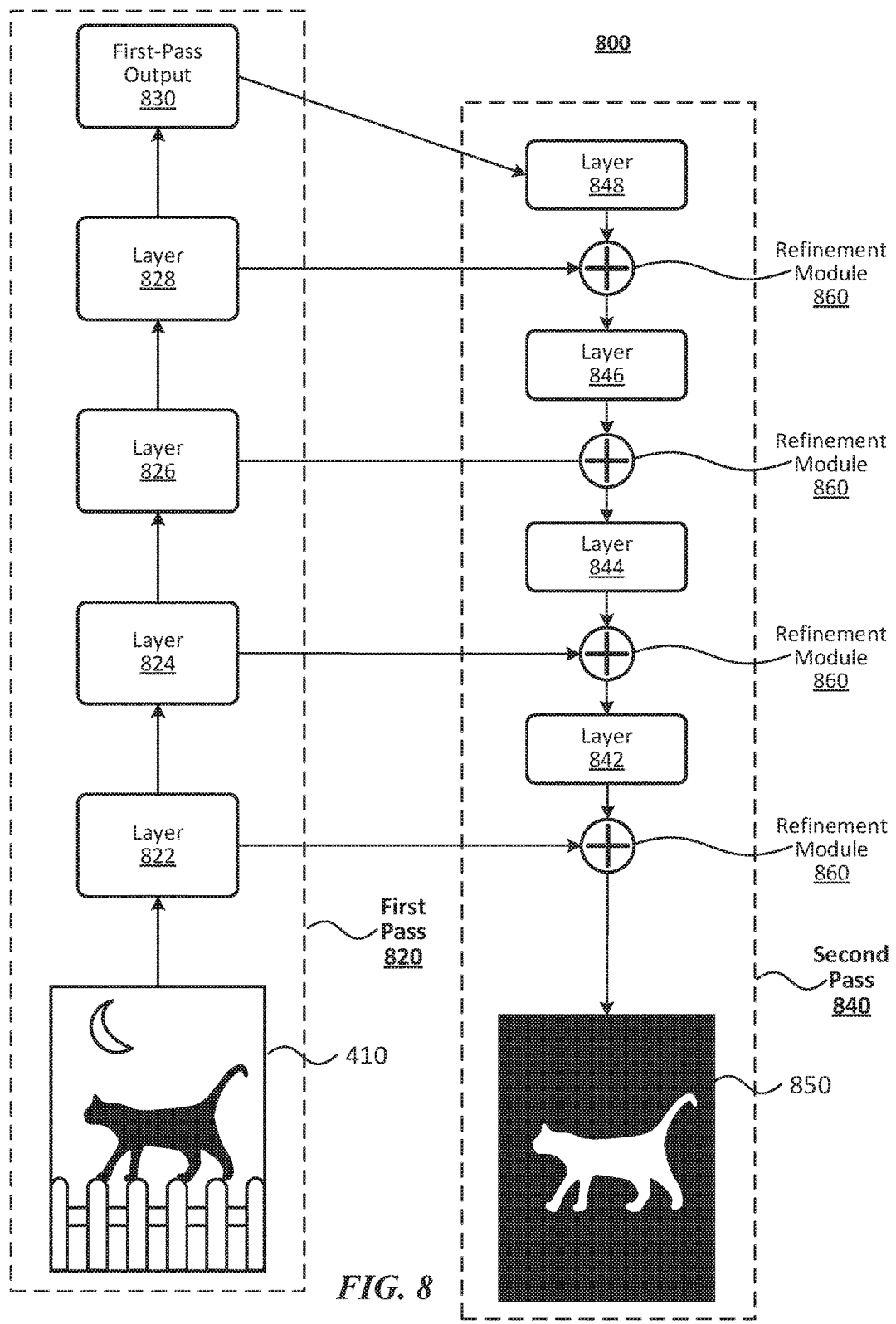
FIG. 8 illustrates a system for predicting refined object proposals.

FIG. 8 depicts a system 800 for generating refined object proposals 850. In particular embodiments, system 800 may generate high-resolution, semantically-meaningful features of an image using a bottom-up/top-down architecture. System 800 may be a feed-forward network that includes a first pass 820 and a second pass 840. First pass 820 may include layers 822, 824, 826, and 828 and first-pass output 830. Second pass 840 may include layers 842, 844, 846, and 848. First pass 820 may take as input image patches 410. As an example and not by way of limitation, as the information is processed and signals are sent to each deeper layer in first pass 820, spatial resolution is lost and more semantically-meaningful information is gained. In other words, the height and width of each layer decreases but the number of feature planes increases. Initially, as information is processed at the bottom of first pass 820 of system 800, the output of the layers (e.g., layer 822) is low-level, basic information about the image (e.g., edges, blobs, etc.). As information is passed to and processed by the top layers (e.g., layer 828), the output of the layers is high-level, semantically-meaningful information (e.g., identification of the location of an object and that it is different from other similar objects). First-pass output 830 may include object-level information. As an example and not by way of limitation, first-pass output 830 may be a semantically-meaningful feature map with multiple channels. As an example and not by way of limitation, first-pass output 830 may include object-proposal encodings (i.e., object proposals 430). The second pass 840 of system 800 is then used in order to extract pixel-level information (i.e., high-resolution information) for image patches 410 in addition to the object-level information obtained in first pass 820.

Second pass 840 of system 800 may include layers 842, 844, 846, and 848. Each of layers 842, 844, 846, and 848 may include the same processing components and/or algorithms as a corresponding layer in first pass 820. As an example and not by way of limitation, layer 842 may be the same as layer 822; layer 844 may be the same as layer 824; layer 846 may be the same as layer 826; and layer 848 may be the same as layer 828. Although layers 842, 844, 846, and 848 may be the same, respectively, as layers 822, 824, 826, and 828, the inputs and outputs of each layer in the second pass 840 will be different than the inputs and outputs of each layer in the first pass 820. Although first pass 820 and second pass 840 are depicted as having a particular number of layers in FIG. 8, it will be understood that this is for clarity and ease of description and not by way of limitation. First pass 820 may include any suitable number of layers, and second pass 840 will include the same number of layers as first pass 820, because each layer in second pass 840 is the same as a layer in first pass 820. Layer 848 may take as input first-pass output 830. After an input image patch is processed by first pass 820 and second pass 840, system 800 will have generated object-level information (e.g., general identification of a penguin in an image) and the pixel-level information (e.g., identification of the edges of the penguin).

In particular embodiments, system 800 refines its outputs by successively integrating information from earlier layers. As an example and not by way of limitation, system 800 may include a refinement module and stack successive such modules together into a top-down refinement process. On first pass 820, system 800 processes input image patch 410 through layers 822, 824, 826, and 828 to generate first-pass output 830 (i.e., object-proposal encoding). Second pass 840 processes first-pass output 830 through layers 848, 846, 844, and 842 in a top-down architecture. The input of each layer in second pass 840 is the output of the immediately-preceding layer in second pass 840 (i.e. object-proposal encodings) combined with the output from a corresponding layer on first pass 820 (i.e., features). In particular embodiments, second pass 840 successively integrates information from earlier layers. Thus, system 800 takes advantage of high-resolution features from first pass 820 in the layers of second pass 840. The output of system 800, refined object proposal 850, may include features that include object-level information and pixel-level information. As an example and not by way of limitation, the object proposal 850 output from the two-pass system 800 will be more precise at a pixel level than the object-proposal encodings in first-pass output 830. As another example and not by way of limitation, refined object proposal 850 may have a resolution that is the same as the resolution of the input image patch 410. Refined object proposal 850 may be a pixel labeling of the same resolution as the input image patch 410.

In particular embodiments, features outputted from layers in the first pass 820 may be combined with object-proposal encodings outputted by layers in second pass 840 using refinement modules 860. Each refinement module 860 may invert the effects of pooling in first pass 820 in order to double the resolution of the input object-proposal encoding (i.e., output from the immediately preceding layer in second pass 840). Each refinement module 860 may be denoted by $R^i$, and each refinement module $R^i$ takes as input an object-proposal encoding $M^i$ generated in the top-down second pass 840 and matching features $F^i$ generated in bottom-up first pass 820. Each refinement module $R^i$ may be trained to merge the object-proposal encoding and the matching features in order to generate a new upsampled object encoding $M^{i+1}$. Thus, $M^{i+1} = R^i (M^i, F^i)$. In particular embodiments, multiple refinement modules 860 are stacked in second pass 840. As an example and not by way of limitation, there may be one refinement module 860 for each layer in the first pass 820 (i.e., every pooling layer).

Although this disclosure describes and illustrates particular embodiments of FIG. 8 being implemented by a system, this disclosure contemplates any suitable embodiments of FIG. 8 as being implemented by any suitable platform or system. As an example, and not by way of limitation, particular embodiments of FIG. 8 may be implemented by social-networking system 160, third-party system 170, or any other suitable system. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
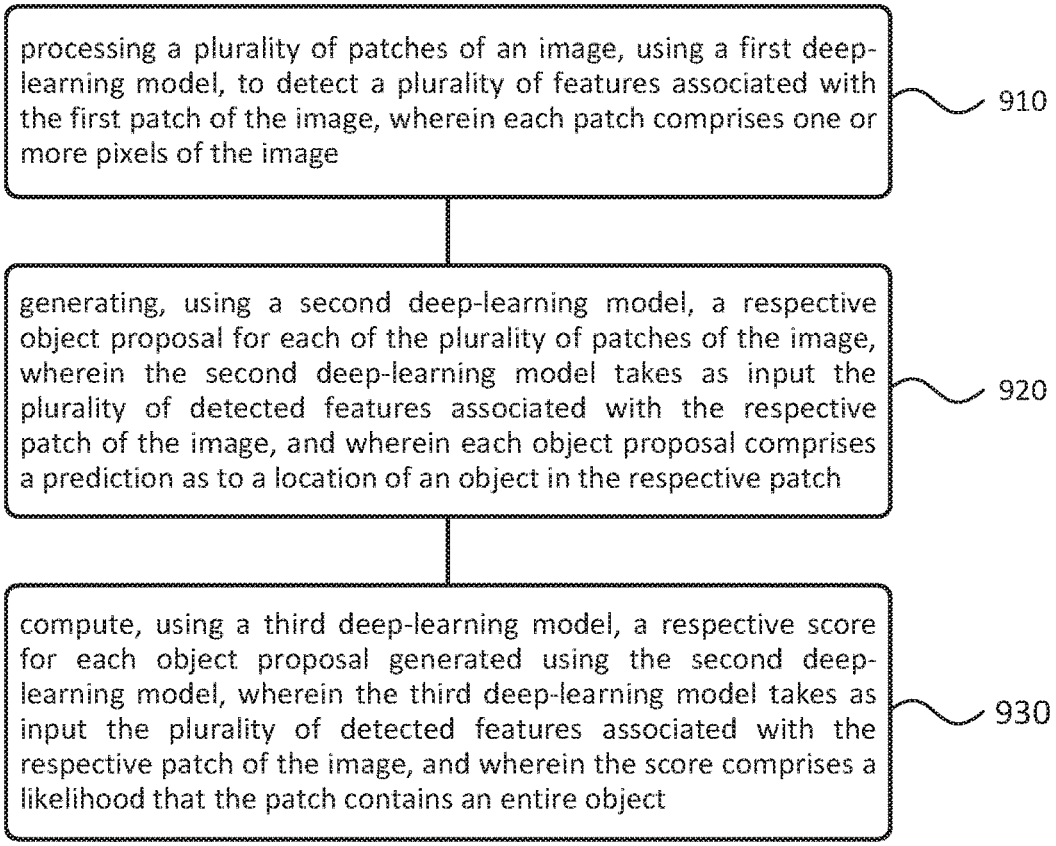
FIG. 9 illustrates an example system for determining object proposals and object scores.

FIG. 9 illustrates an example method for generating object proposals and object scores. At step 910, the system processes a plurality of patches of an image, using a first deep-learning model, to detect a plurality of features associated with the first patch of the image. Each patch includes one or more pixels of the image. At step 920, the system generates, using a second deep-learning model, a respective object proposal for each of the plurality of patches of the image. The second deep-learning model takes as input the plurality of detected features associated with the respective patch of the image, and each object proposal includes a prediction as to a location of an object in the patch. At step 930, the system computes, using a third deep-learning model, a respective score for each object proposal generated using the second deep-learning model. The third deep-learning model may take as input the plurality of detected features associated with the respective patch of the image, and the object score may include a likelihood that the patch contains an entire object.

Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating object proposals and object scores including the particular steps of the method of FIG. 9, this disclosure contemplates any suitable method for generating object proposals and object scores including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9. As an example and not by way of limitation, the particular steps of the method of FIG. 9 may be performed by client system 130, social-networking system 160, or third-party system 170.

FIG. 10 illustrates an example method for generating refined object proposals. At step 1010, the system processes a plurality of patches of an image, using a first set of layers of a convolutional neural network, to output a plurality of object proposals associated with the plurality of patches of the image. Each patch includes one or more pixels of the image. Each object proposal includes a prediction as to a location of an object in the respective patch. At step 1020, the system processes, using a second set of layers of the convolutional neural network, the plurality of object proposals outputted by the first set of layers of the convolutional neural network, to generate a plurality of refined object proposals. Each refined object proposal includes pixel-level information for the respective patch of the image. The first layer in the second set of layers of the convolutional neural network takes as input the plurality of object proposals outputted by the first set of layers. Each layer after the first layer in the second set of layers takes as input the output of a preceding layer in the second set of layers combined with the output of a respective layer of the first set of layers.

Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for generating refined object proposals including the particular steps of the method of FIG. 10, this disclosure contemplates any suitable method for generating refined object proposals including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10. As an example and not by way of limitation, the particular steps of the method of FIG. 10 may be performed by client system 130, social-networking system 160, or third-party system 170.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, privacy settings may allow a user to specify whether or not images associated with the user may be analyzed by a system in order to determine object proposals and/or refined object proposals. As an example and not by way of limitation, a user may specify that images that she has uploaded to social-networking system 160 may not be analyzed by social-networking system 160 in order to determine object proposals. Privacy settings may additionally allow a user to specify whether or not images associated with the user may be analyzed by the system in order to determine object proposals and/or refined object proposals on an image-by-image basis. As an example and not by way of limitation, the user may specify that a first photo that she uploaded to social-networking system 160 may be analyzed for object proposals, whereas a second photo that she uploaded to social-networking system 160 may not be analyzed for object proposals. In particular embodiments, privacy settings may allow a user to specify whether or not that user may be identified as being associated with an image based on determined object proposal and/or refined object proposals. As an example and not by way of limitation, social-networking system 160 may determine that an object proposal identified in an image corresponds to a particular user. That user may, however, specify that social-networking system 160 may not identify her as being associated with images in which she has been identified via this analysis. As an example and not by way of limitation, social-networking system 160 may not tag this user in the photo in which she has been identified based on her privacy settings.

Systems and Methods

Figure 11:
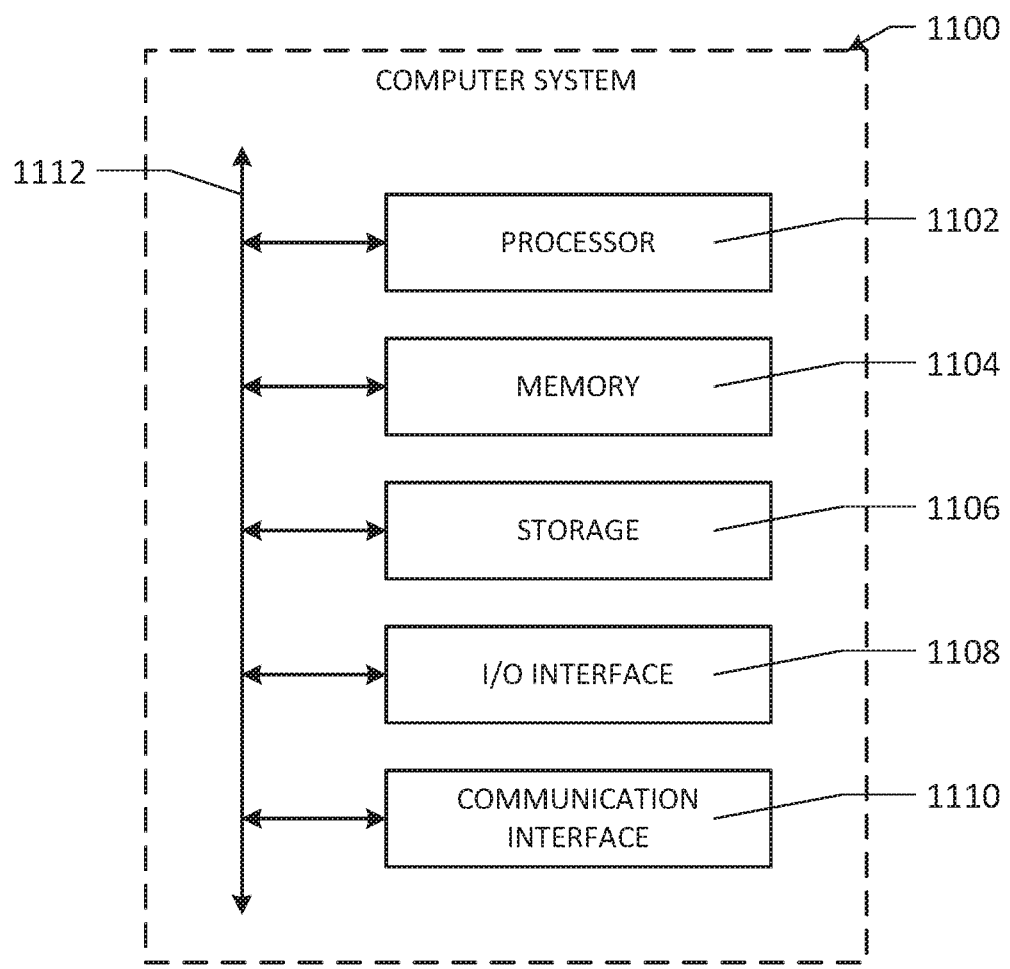
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    accessing an image, wherein the image comprises a plurality of patches, wherein each patch comprises one or more pixels;
    generating, using a first deep-learning model, a first-pass output comprising object-level information for each patch of the image in a first-pass, wherein the first-pass of the first deep-learning model takes as input the plurality of patches of the image;
    generating, using the first deep-learning model, a respective object proposal comprising pixel-level information for each patch of the image in a second-pass, wherein the second-pass of the first deep-learning model takes as input the first-pass output; and
    computing, using a second deep-learning model, a respective score for each object proposal generated using the first deep-learning model, wherein the second deep-learning model takes as input the first-pass output, and wherein the score comprises a likelihood that the patch of the respective object proposal contains an entire object.

2. The method of claim 1, wherein the first-pass comprises a number N of layers.

3. The method of claim 2, wherein:
    a first layer of the first-pass takes as input the plurality of patches; and
    each remaining layer of the N layers of the first-pass takes as input a respective output of a previous layer of the N layers of the first-pass.

4. The method of claim 3, wherein the second-pass comprises the number N of layers.

5. The method of claim 4, wherein:
    a first layer of the second-pass takes as input the first-pass output; and
    each remaining layer of the N layers of the second-pass takes as input a respective output of a previous layer of the N layers of the second-pass and output from a corresponding layer of the N layers of the first-pass.

6. The method of claim 1, wherein the respective object proposal of each patch comprises a prediction of a location of an object in the respective patch.

7. The method of claim 1, wherein the respective score of each object proposal comprises a likelihood that the respective patch of each object proposal contains an entire object.

8. The method of claim 7, wherein the respective score of each object proposal further comprises a likelihood that the entire object is centered in the respective patch.

9. The method of claim 1, wherein the image is associated with a privacy setting indicating a permission for generation of object proposals of the image.

10. The method of claim 1, wherein a respective object proposal of a patch is represented as a shape overlaying an object in the image.

11. The method of claim 1, wherein:
    the first-pass comprises forward-pass layers; and
    the second-pass comprises backward-pass layers.

12. The method of claim 1, further comprising:
    generating a sliding window having a fixed size; and
    shifting the sliding window over the image to generate the plurality of patches.

13. The method of claim 12, wherein the generated plurality of patches comprises a first set of overlapping patches.

14. The method of claim 13, further comprising:
    resizing the image; and
    shifting the sliding window over the resized image to create a new set of overlapping patches.

15. The method of claim 14, further comprising:
    iteratively resizing the image and shifting the sliding window over each resized image until at least one patch contains an entire object.

16. The method of claim 1, further comprising:
    generating an identification of an object in the image based on at least one respective object proposal of a patch of the plurality of patches.

17. The method of claim 1, further comprising:
    ranking the plurality of object proposals based on their respective scores; and
    determining a subset of object proposals of the plurality of object proposals based on the ranking.

18. One or more computer-readable non-transitory storage media embodying software that is operable when executed to:

access an image, wherein the image comprises a plurality of patches, wherein each patch comprises one or more pixels;

generate, using a first deep-learning model, a first-pass output comprising object-level information for each patch of the image in a first-pass, wherein the first-pass of the first deep-learning model takes as input the plurality of patches of the image;

generate, using the first deep-learning model, a respective object proposal comprising pixel-level information for each patch of the image in a second-pass, wherein the second-pass of the first deep-learning model takes as input the first-pass output; and compute, using a second deep-learning model, a respective score for each object proposal generated using the first deep-learning model, wherein the second deep-learning model takes as input the first-pass output, and wherein the score comprises a likelihood that the patch of the respective object proposal contains an entire object.

19. A system comprising one or more processors and a memory coupled to the processors comprising instructions executable by the processors, the processors operable when executing the instructions to:

access an image, wherein the image comprises a plurality of patches, wherein each patch comprises one or more pixels;

generate, using a first deep-learning model, a first-pass output comprising object-level information for each patch of the image in a first-pass, wherein the first-pass of the first deep-learning model takes as input the plurality of patches of the image;

generate, using the first deep-learning model, a respective object proposal comprising pixel-level information for each patch of the image in a second-pass, wherein the second-pass of the first deep-learning model takes as input the first-pass output; and compute, using a second deep-learning model, a respective score for each object proposal generated using the first deep-learning model, wherein the second deep-learning model takes as input the first-pass output, and wherein the score comprises a likelihood that the patch of the respective object proposal contains an entire object.

\* \* \* \* \*